(12) United States Patent
Nakajima (10) Patent No.: US 11,858,296 B2
(45) Date of Patent: Jan. 2, 2024

(54) TIRE

(71) Applicant: SUMITOMO RUBBER INDUSTRIES, LTD., Hyogo (JP)

(72) Inventor: Koichi Nakajima, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 17/525,061

(22) Filed: Nov. 12, 2021

(65) Prior Publication Data

US 2022/0161607 A1    May 26, 2022

(30) Foreign Application Priority Data

Nov. 20, 2020   (JP) ................. 2020-193440

(51) Int. Cl.
*B60C 13/00*   (2006.01)
(52) U.S. Cl.
CPC ................. *B60C 13/001* (2013.01)
(58) Field of Classification Search
CPC .................................................. B60C 13/001
See application file for complete search history.

(56) References Cited

U.S. PATENT DOCUMENTS

| 2010/0180994 A1* | 7/2010 | Yamaguchi ............ B60C 11/01 152/153 |
| 2013/0068362 A1 | 3/2013 | Kudo |
| 2018/0099530 A1 | 4/2018 | Yonetsu |
| 2019/0291516 A1* | 9/2019 | Nakajima ............ B60C 13/001 |

FOREIGN PATENT DOCUMENTS

| EP | 0490247 A1 * | 6/1992 | ............ B60C 13/00 |
| EP | 3666555 A1 * | 6/2020 | .......... B60C 13/001 |
| EP | 3 792 082 | 3/2021 | |
| JP | 2012-001031 | 1/2012 | |
| JP | 2013-63677 A | 4/2013 | |

OTHER PUBLICATIONS

Extended European Search Report conducted in counterpart Europe Appln. No. 21204139.6 (dated May 23, 2022).

* cited by examiner

*Primary Examiner* — Justin R Fischer
*Assistant Examiner* — Wendy L Boss
(74) *Attorney, Agent, or Firm* — Greenblum & Bernstein, P.L.C.

(57) ABSTRACT

A tire that can achieve both desired visibility and design properties of a mark provided on a sidewall portion is provided. A tire has a mark provided on a surface of a sidewall portion so as to be raised from the surface. The mark includes a curved surface portion curved so as to project in a direction substantially perpendicular to the surface of the sidewall portion, and a flat surface portion provided on at least one side in a tire circumferential direction of the curved surface portion, and a raised height h of the flat surface portion from the surface gradually decreases with increasing distance in the tire circumferential direction from the curved surface portion.

19 Claims, 6 Drawing Sheets

TIRE

CROSS REFERENCE TO RELATED APPLICATION(S)

The present application claims priority to Japanese patent application JP 2020-193440, filed on Nov. 20, 2020, the entire contents of which is incorporated herein by reference in its entirety.

BACKGROUND

Technical Field

The present disclosure relates to a tire having a mark provided on a sidewall portion.

Description of the Background Art

Conventionally, a tire having a mark provided on the surface of a sidewall portion so as to be raised from the surface has been known. For example, Japanese Laid-Open Patent Publication No. 2013-063677 proposes a pneumatic tire having a warped surface formed on a side surface of a mark indication portion where a mark is indicated.

However, in the pneumatic tire of Japanese Laid-Open Patent Publication No. 2013-063677, the height of the mark is uniform, and a sidewall portion on which the mark is provided is a curved surface which is curved in the tire radial direction. Thus, there is a problem that the visibility of the mark is impaired depending on the position in the tire radial direction at which the mark is disposed. In addition, for the mark of Japanese Laid-Open Patent Publication No. 2013-063677, there is room for improvement in design properties as well.

The present disclosure has been made in view of the above circumstances, and a main object of the present disclosure is to provide a tire that can achieve both desired visibility and design properties of a mark provided on a sidewall portion.

SUMMARY

The present disclosure is directed to a tire including a mark provided on a surface of a sidewall portion so as to be raised from the surface, wherein the mark includes a curved surface portion curved so as to project in a direction substantially perpendicular to the surface, and a flat surface portion provided on at least one side in a tire circumferential direction of the curved surface portion, and a raised height of the flat surface portion from the surface gradually decreases with increasing distance in the tire circumferential direction from the curved surface portion.

DESCRIPTION OF THE PREFERRED EMBODIMENTS

Hereinafter, an embodiment of the present disclosure will be described in detail with reference to the drawings.

Figure 1:
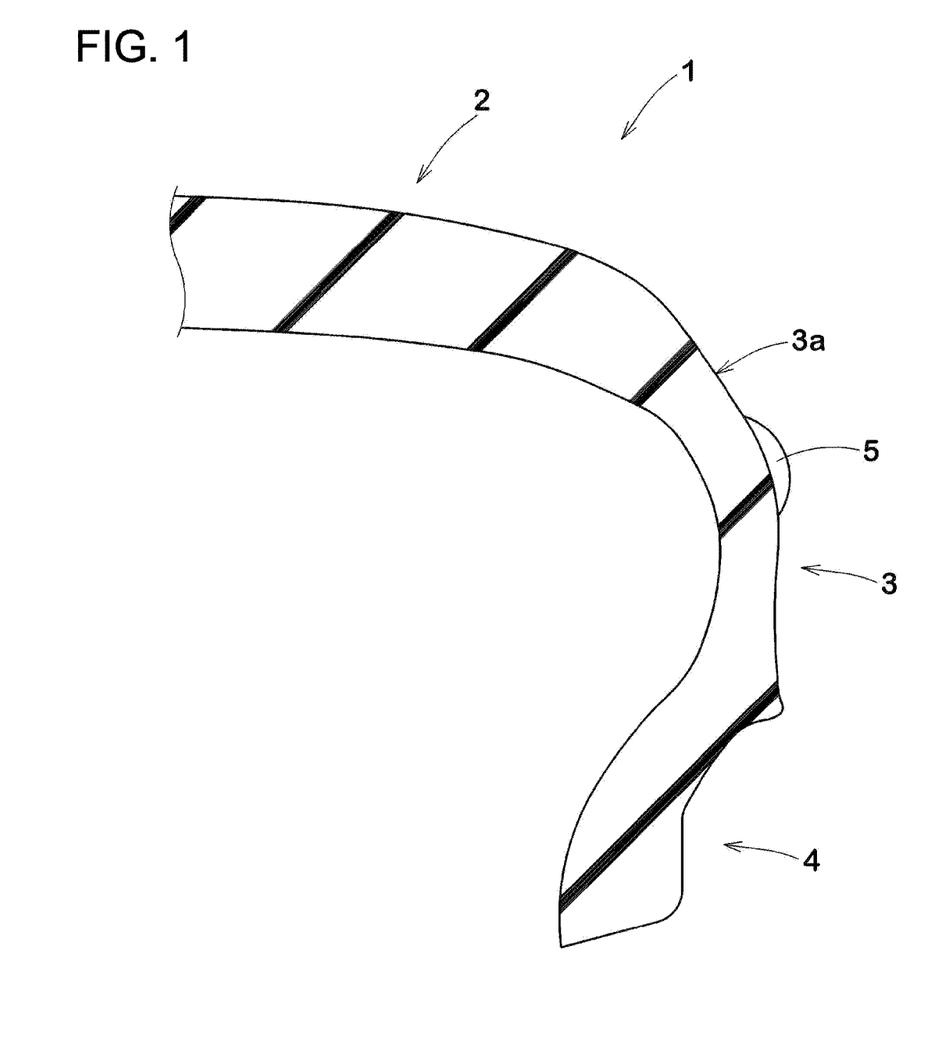
FIG. 1 is a schematic cross-sectional view showing an embodiment of the tire according to the present disclosure.

FIG. 1 is a schematic cross-sectional view showing a tire 1 according to the present embodiment in a normal state, wherein the internal structure thereof is omitted. As shown in FIG. 1, the tire 1 is suitably used, for example, as a pneumatic tire for a passenger car. The tire 1 is not limited to a pneumatic tire for a passenger car, and can be used, for example, as various tires such as a pneumatic tire for a heavy-duty vehicle, a pneumatic tire for a motorcycle, and an airless tire the interior of which is not filled with pressurized air.

In the case where the tire 1 is a pneumatic tire, the "normal state" is a state where the tire 1 is fitted on a normal rim and adjusted to a normal internal pressure and no load is applied to the tire 1. In the present specification, unless otherwise specified, dimensions and the like of components of the tire 1 are values measured in the normal state.

If there is a standard system including a standard on which the tire 1 is based, the "normal rim" is a rim that is defined for each tire by the standard, and is, for example, the "standard rim" in the JATMA standard, the "Design Rim" in the TRA standard, or the "Measuring Rim" in the ETRTO standard. If there is no standard system including a standard on which the tire 1 is based, the "normal rim" is a rim that is defined for each tire by the manufacturer or the like.

If there is a standard system including a standard on which the tire 1 is based, the "normal internal pressure" is an air pressure that is defined for each tire by each standard, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard. If there is no standard system including a standard on which the tire 1 is based, the "normal internal pressure" is an air pressure that is defined for each tire by the manufacturer or the like.

The tire 1 according to the present embodiment includes a tread portion 2 which comes into contact with a road surface during running, a sidewall portion 3 which is disposed inward of the tread portion 2 in the tire radial direction, and a bead portion 4 which is disposed inward of the sidewall portion 3 in the tire radial direction. The bead portion 4 is a portion fitted to a rim when the tire 1 is mounted on the rim. The sidewall portion 3 is a portion connecting the tread portion 2 and the bead portion 4.

Figure 2:
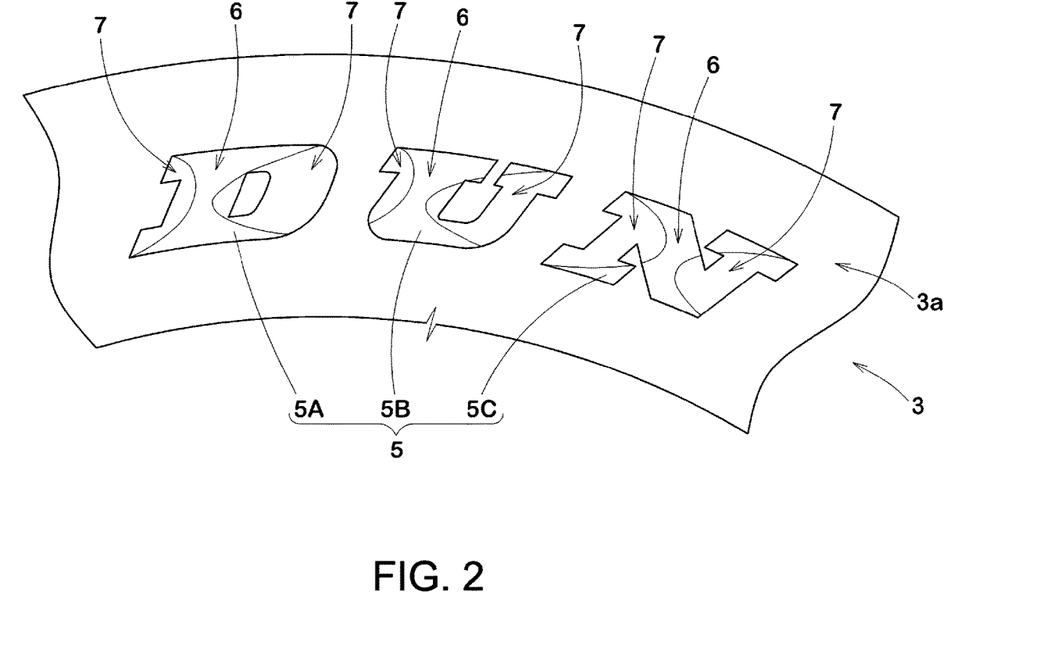
FIG. 2 is a partial side view of a sidewall portion.

FIG. 2 is a partial side view of the sidewall portion 3. As shown in FIG. 1 and FIG. 2, in the tire 1 according to the present embodiment, a mark 5 is provided on a surface 3*a* of the sidewall portion 3 so as to be raised from the surface 3*a*. On the sidewall portion 3, for example, a plurality of marks 5 including a first mark 5A composed of a character, a second mark 5B composed of a character, and a third mark 5C composed of a character are aligned adjacently in the tire circumferential direction.

The mark 5 is not limited to such a plurality of marks 5 aligned adjacently in the tire circumferential direction, and may be composed of, for example, one mark 5. In addition, the mark 5 may be, for example, a symbol, a figure, or the like instead of a character.

Figure 3:
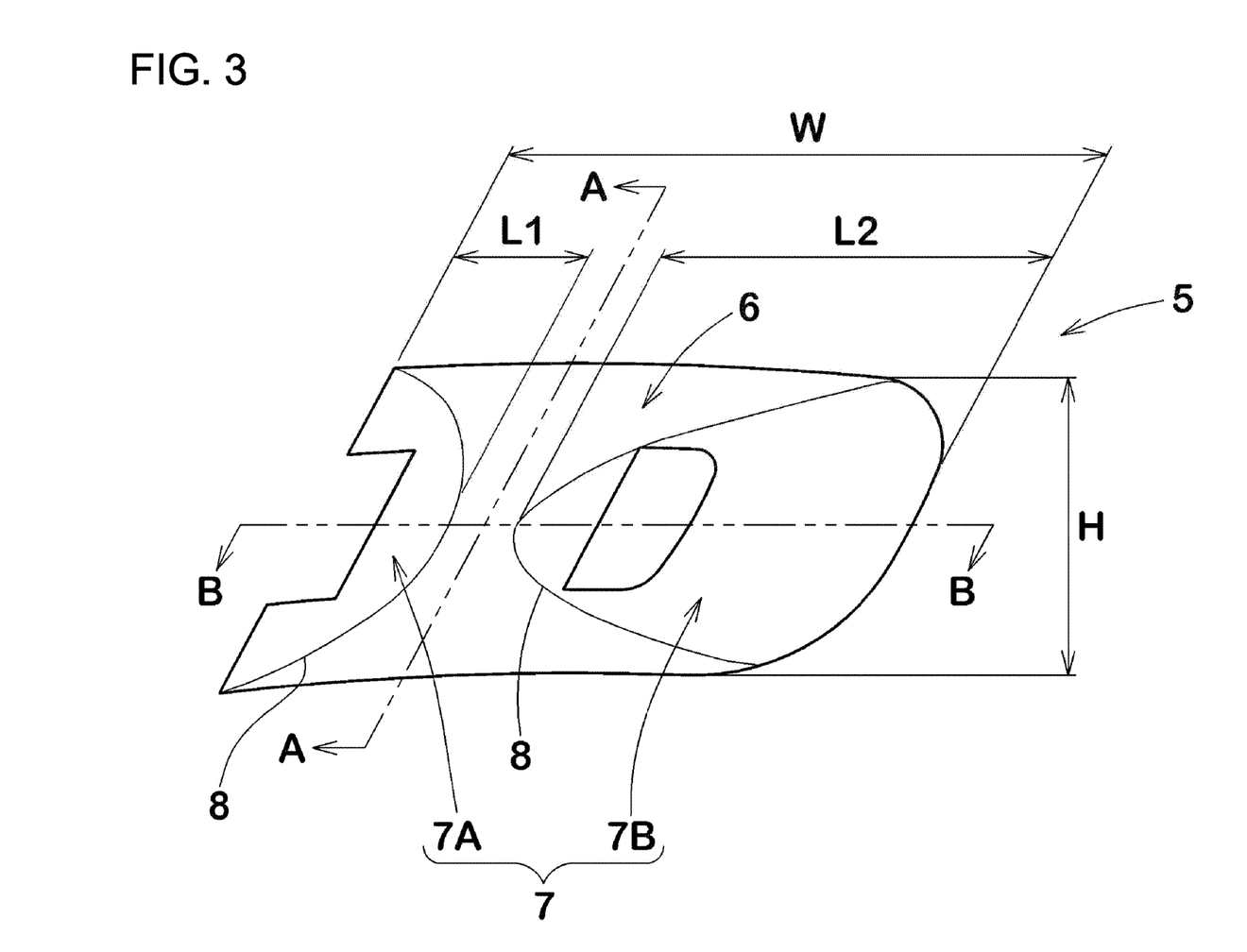
FIG. 3 is an enlarged view of a mark in FIG. 2.
Figure 4:
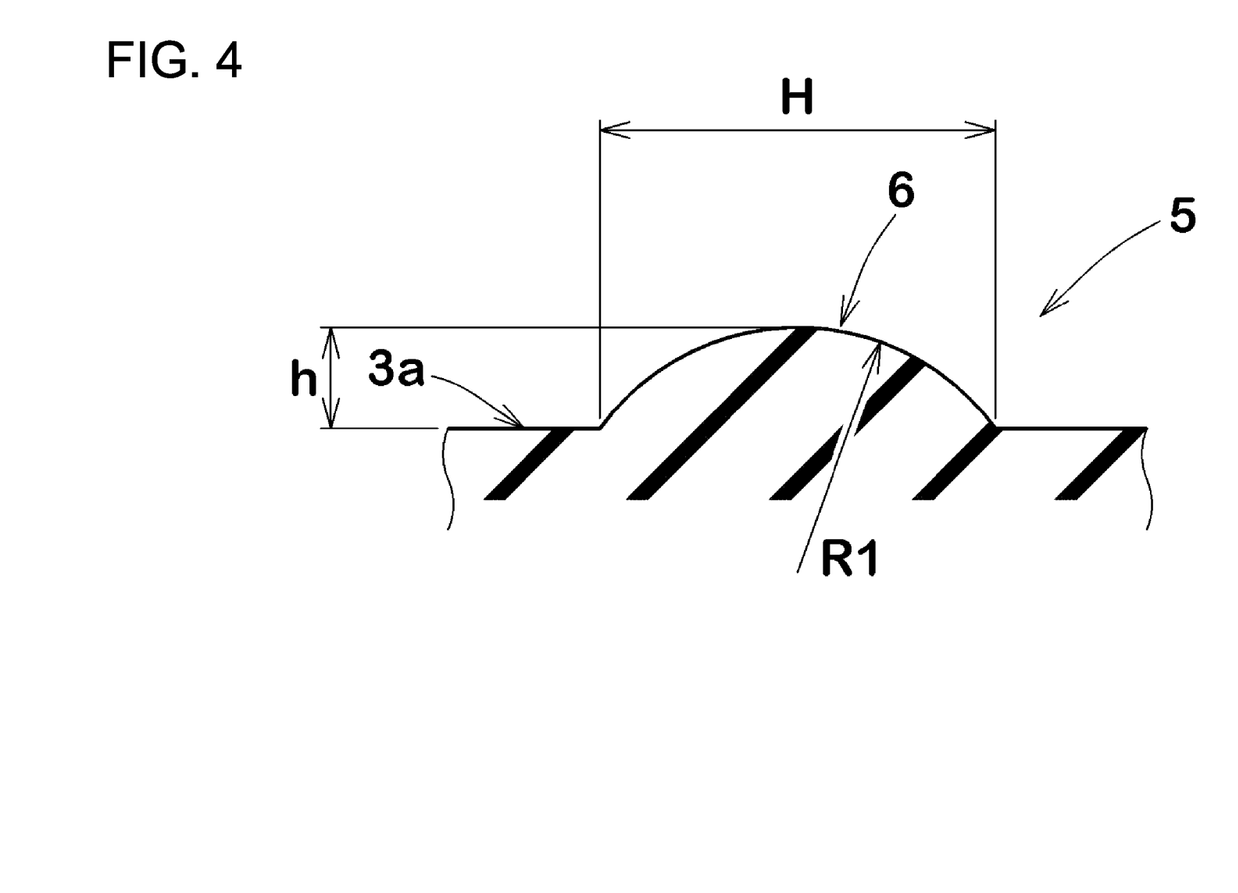
FIG. 4 is a cross-sectional view taken along a line A-A in FIG. 3.
Figure 5:
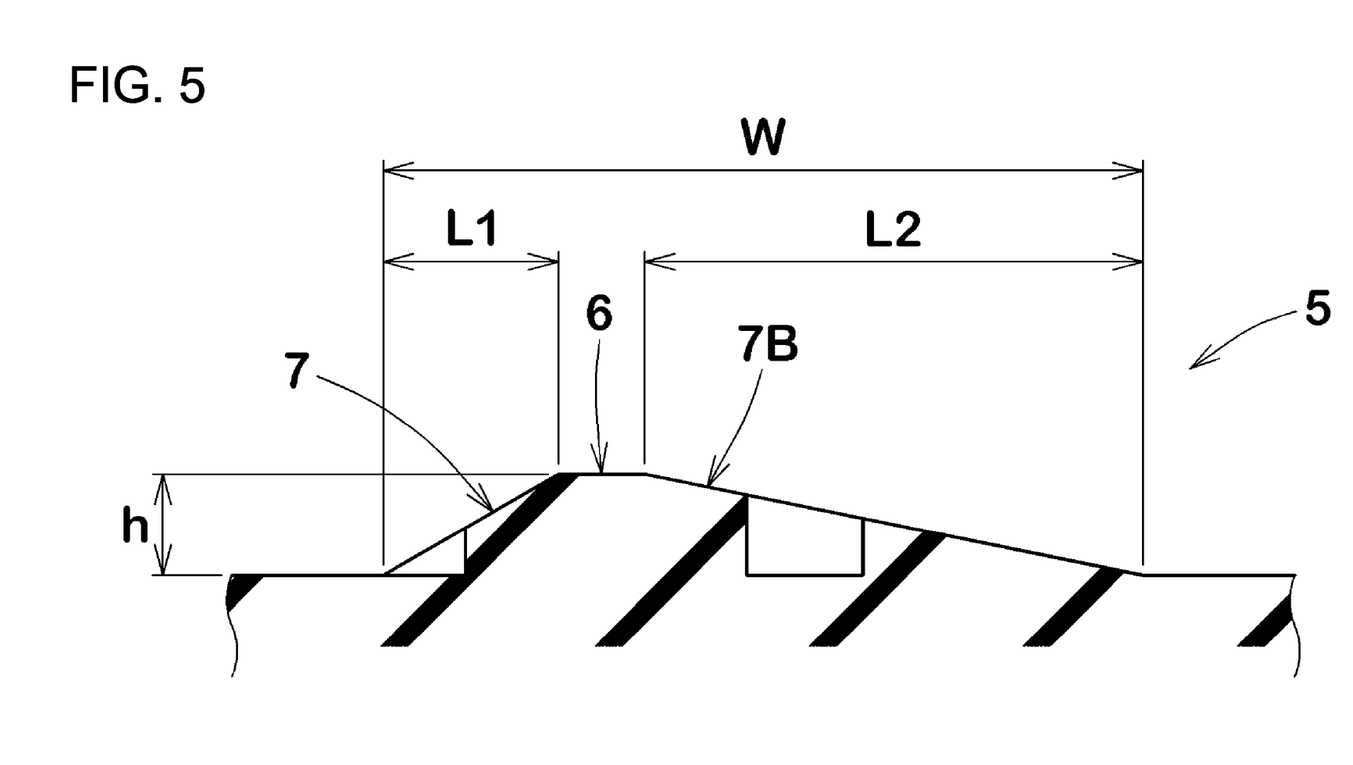
FIG. 5 is a cross-sectional view taken along a line B-B in FIG. 3.

FIG. 3 is an enlarged view of the mark 5 in FIG. 2. FIG. 4 is a cross-sectional view taken along a line A-A in FIG. 3, and FIG. 5 is a cross-sectional view taken along a line B-B in FIG. 3. As shown in FIG. 2 to FIG. 5, the mark 5 of the present embodiment includes a curved surface portion 6 which is curved so as to project in a direction substantially perpendicular to the surface 3*a* of the sidewall portion 3, and a flat surface portion 7 which is provided on at least one side in the tire circumferential direction of the curved surface portion 6 and whose raised height h from the surface 3*a* gradually decreases with increasing distance in the tire circumferential direction from the curved surface portion 6. The curved surface portion 6 is curved, for example, such that a curved portion appears in a tire meridian cross-section including the curved surface portion 6.

In such a mark 5, a contrast is clarified by the curved surface portion 6 and the flat surface portion 7 whose raised height h gradually decreases, regardless of the position in the tire radial direction at which the mark 5 is disposed, so that the visibility of the mark 5 can be improved. In addition, in the mark 5, when light is applied to the curved surface portion 6, the reflected light smoothly moves in accordance with the angle of the applied light, so that the mark 5 produces a soft impression and has excellent design properties. Therefore, the tire 1 according to the present embodiment can achieve both desired visibility and design properties of the mark 5 provided on the sidewall portion 3.

In a more preferable mode, a boundary line 8 between the curved surface portion 6 and the flat surface portion 7 is a curved line which is curved so as to project on the curved surface portion 6 side when being viewed in the tire axial direction. Such a boundary line 8 can improve the design properties of the mark 5.

The flat surface portion 7 is preferably provided on both sides in the tire circumferential direction of the curved surface portion 6. The flat surface portion 7 of the present embodiment includes a first flat surface portion 7A provided on one side in the tire circumferential direction of the curved surface portion 6, and a second flat surface portion 7B provided on the other side in the tire circumferential direction of the curved surface portion 6. In the case where a plurality of marks 5 are aligned, each mark 5 preferably includes the first flat surface portion 7A and the second flat surface portion 7B.

A length L1 in the tire circumferential direction of the first flat surface portion 7A is preferably not less than 15% of a width Win the tire circumferential direction of the mark 5. When the length L1 of the first flat surface portion 7A is not less than 15% of the width W of the mark 5, the design properties of the boundary line 8 between the first flat surface portion 7A and the curved surface portion 6 can be improved. From such a viewpoint, the length L1 of the first flat surface portion 7A is more preferably not less than 20% of the width W of the mark 5 and further preferably not less than 25% of the width W of the mark 5.

A length L2 in the tire circumferential direction of the second flat surface portion 7B is preferably not less than 40% of the width W of the mark 5. When the length L2 of the second flat surface portion 7B is not less than 40% of the width W of the mark 5, the design properties of the boundary line 8 between the second flat surface portion 7B and the curved surface portion 6 can be improved. From such a viewpoint, the length L2 of the second flat surface portion 7B is more preferably not less than 43% of the width W of the mark 5 and further preferably not less than 46% of the width W of the mark 5.

The sum (L1+L2) of the length L1 of the first flat surface portion 7A and the length L2 of the second flat surface portion 7B is preferably not greater than 90% of the width W of the mark 5. When the sum (L1+L2) of the lengths is not greater than 90% of the width W of the mark 5, the visibility of the curved surface portion 6 can be improved. From such a viewpoint, the sum (L1+L2) of the lengths is more preferably not greater than 85% of the width W of the mark 5 and further preferably not greater than 80% of the width W of the mark 5.

The length L1 of the first flat surface portion 7A may be, for example, different from or equal to the length L2 of the second flat surface portion 7B. In FIG. 3, the length L1 of the first flat surface portion 7A is smaller than the length L2 of the second flat surface portion 7B. Such a flat surface portion 7 can give a dynamic impression to the mark 5 and improve the design properties of the mark 5. When the length L1 of the first flat surface portion 7A is equal to the length L2 of the second flat surface portion 7B, a contrast that is uniform regardless of the direction in which the mark 5 is viewed can be produced, so that the visibility of the mark 5 can be improved.

The length L1 of the first flat surface portion 7A and the length L2 of the second flat surface portion 7B are preferably determined as appropriate such that the curved surface portion 6 can be formed at a continuous position in the tire radial direction of the mark 5. Since the curved surface portion 6 is formed continuously in the tire radial direction, the visibility of such a mark 5 can be improved.

As shown in FIG. 2 and FIG. 3, in the case where a plurality of marks 5 are aligned, the length L1 of the first flat surface portion 7A and the length L2 of the second flat surface portion 7B may be, for example, different from or equal to each other in each of the marks 5.

When the length L1 of the first flat surface portion 7A and the length L2 of the second flat surface portion 7B of each mark 5 are different from each other, the curved surface portion 6 can be formed at an appropriate position in each mark 5, so that the visibility of each mark 5 can be improved. When the length L1 of the first flat surface portion 7A and the length L2 of the second flat surface portion 7B of each mark 5 are equal to each other, a sense of unity can be given to the marks 5, so that the design properties of the marks 5 can be improved.

The second flat surface portion 7B of one mark 5 out of two marks 5 adjacent to each other in the tire circumferential direction and the first flat surface portion 7A of the other mark 5 integrally form, for example, one pattern. In this case, the length L2 of the second flat surface portion 7B of the one mark 5 and the length L1 of the first flat surface portion 7A of the other mark 5 may be, for example, different from or equal to each other.

When the length L2 of the second flat surface portion 7B of the one mark 5 and the length L1 of the first flat surface portion 7A of the other mark 5 are different from each other, directivity is given to the pattern formed by the second flat surface portion 7B of the one mark 5 and the first flat surface portion 7A of the other mark 5, so that the design properties of the marks 5 as a whole can be improved. When the length L2 of the second flat surface portion 7B of the one mark 5 and the length L1 of the first flat surface portion 7A of the other mark 5 are equal to each other, the balance between each mark 5 can be improved, so that the visibility of the marks 5 as a whole can be improved.

As shown in FIG. 4, the maximum raised height h of the mark 5 is preferably 14% to 24% of a height H in the tire radial direction of the mark 5. When the raised height h is not less than 14% of the height H, the visibility of the mark 5 can be improved. From such a viewpoint, the raised height h is more preferably not less than 15% of the height H and further preferably not less than 17% of the height H.

When the raised height h is not greater than 24% of the height H, the mark 5 can be inhibited from excessively protruding, so that the durability of the mark 5 can be improved. From such a viewpoint, the raised height h is more preferably not greater than 23% of the height H and further preferably not greater than 21% of the height H.

The contour of the curved surface portion 6 of the present embodiment in the tire meridian cross-section has a constant radius of curvature R1. Such a curved surface portion 6 can form the boundary line 8 with the flat surface portion 7 in a parabolic shape and give a harmonious impression to the mark 5, so that the design properties of the mark 5 can be improved.

The radius of curvature R1 of the curved surface portion 6 is preferably 65% to 105% of the height H in the tire radial direction of the mark 5. When the radius of curvature R1 is not less than 65% of the height H, the raised height h of the mark 5 can be inhibited from being excessively large, so that the durability of the mark 5 can be improved. From such a viewpoint, the radius of curvature R1 is more preferably not less than 80% of the height H and further preferably not less than 90% of the height H.

When the radius of curvature R1 is not greater than 105% of the height H, the raised height h of the mark 5 can be increased, so that the visibility of the mark 5 can be improved. From such a viewpoint, the radius of curvature R1 is more preferably not greater than 100% of the height H and further preferably not greater than 95% of the height H.

In the case where a plurality of marks 5 are aligned, the radii of curvature R1 of the curved surface portions 6 of the respective marks 5 may be, for example, different from each other in accordance with the height H of each mark 5, or may be equal to each other.

When the radii of curvature R1 of the curved surface portions 6 of the respective marks 5 are different from each other, a radius of curvature R1 suitable for each mark 5 can be adopted, so that the visibility of each mark 5 can be improved. When the radii of curvature R1 of the curved surface portions 6 of the respective marks 5 are equal to each other, a sense of unity can be given to the respective marks 5 aligned, so that the design properties of the marks 5 can be improved.

Figure 6:
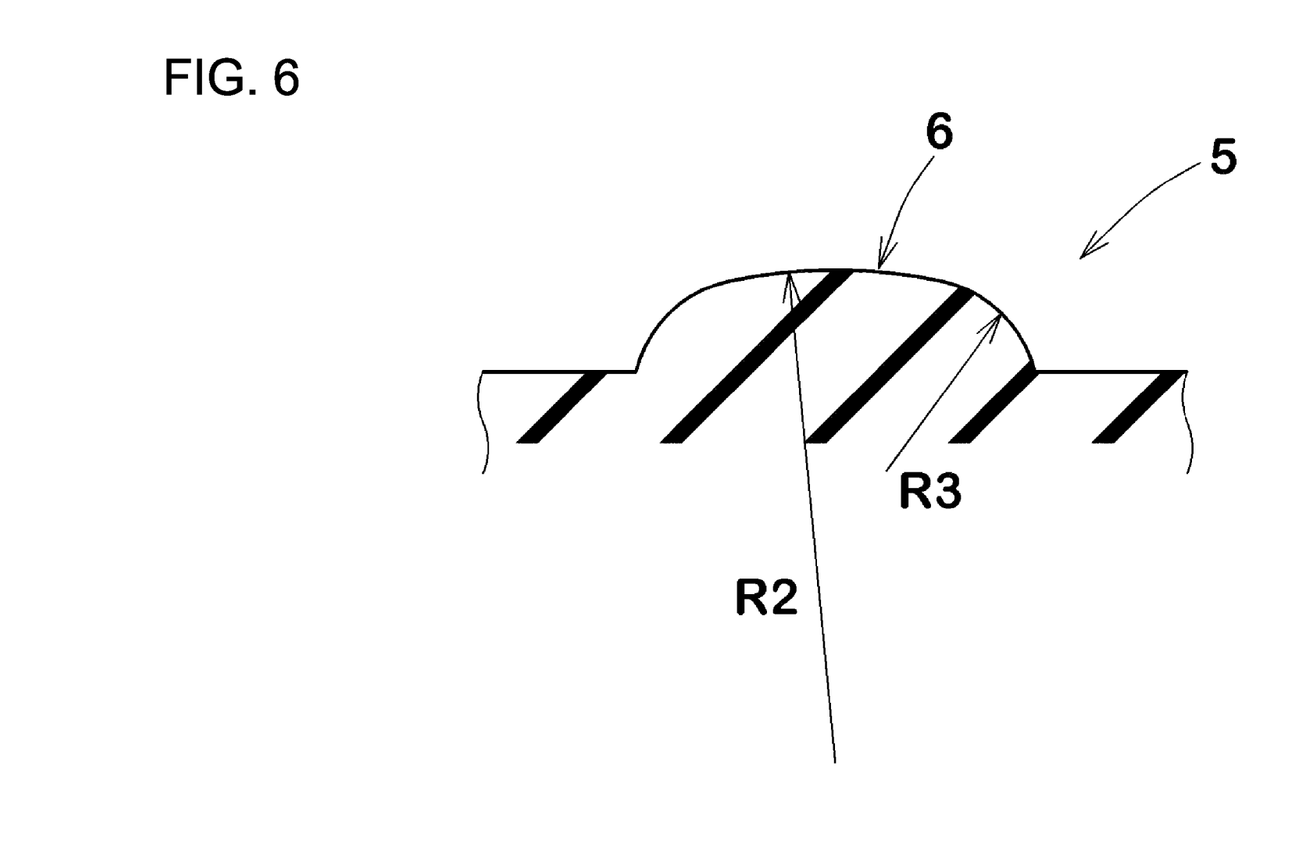
FIG. 6 shows another embodiment of the cross-sectional view taken along the line A-A in FIG. 3.

FIG. 6 shows another embodiment of the cross-sectional view taken along the line A-A in FIG. 3. As shown in FIG. 6, the contour of the curved surface portion 6 in the tire meridian cross-section has a plurality of radii of curvature, in this embodiment, two radii of curvature R2 and R3. The kinds of radii of curvature are not limited to two, and may be, for example, three or more. Such a curved surface portion 6 can form the boundary line 8 with the flat surface portion 7 as an arbitrary curved line.

In the curved surface portion 6 of this embodiment, a curved line having the smaller radius of curvature R3 is formed on each of both sides in the tire radial direction of the larger radius of curvature R2. However, the curved surface portion 6 may have, for example, the larger radius of curvature R2 on one side in the tire radial direction and the smaller radius of curvature R3 on the other side in the tire radial direction.

In this case, for example, the curved surface portion 6 preferably has the larger radius of curvature R2 on the tire maximum width position side. Such a curved surface portion 6 can exhibit excellent visibility even when the mark 5 is disposed at a position where the sidewall portion 3 is inclined relative to the tire radial direction.

In the tire according to the present disclosure, the flat surface portion preferably includes a first flat surface portion provided on one side in the tire circumferential direction of the curved surface portion, and a second flat surface portion provided on another side in the tire circumferential direction of the curved surface portion.

In the tire according to the present disclosure, a length in the tire circumferential direction of the first flat surface portion is preferably smaller than a length in the tire circumferential direction of the second flat surface portion.

In the tire according to the present disclosure, the length in the tire circumferential direction of the first flat surface portion is preferably equal to the length in the tire circumferential direction of the second flat surface portion.

In the tire according to the present disclosure, a boundary line between the curved surface portion and the flat surface portion is preferably a curved line curved so as to project on the curved surface portion side when being viewed in a tire axial direction.

In the tire according to the present disclosure, a contour of the curved surface portion in a tire meridian cross-section preferably has a plurality of radii of curvature.

In the tire according to the present disclosure, the contour of the curved surface portion in the tire meridian cross-section preferably has a constant radius of curvature.

In the tire according to the present disclosure, preferably, a plurality of the marks are aligned adjacently in the tire circumferential direction on the sidewall portion, each of the plurality of the marks includes the first flat surface portion and the second flat surface portion, and the length in the tire circumferential direction of the second flat surface portion of one of the two marks adjacent to each other in the tire circumferential direction and the length in the tire circumferential direction of the first flat surface portion of the other are different from each other.

In the tire according to the present disclosure, the mark includes the curved surface portion curved so as to project in the direction substantially perpendicular to the surface, and the flat surface portion provided on at least one side in the tire circumferential direction of the curved surface portion, and the raised height of the flat surface portion from the surface gradually decreases with increasing distance in the tire circumferential direction from the curved surface portion.

In such a mark, a contrast is clarified by the curved surface portion and the flat surface portion whose height gradually decreases, regardless of the position in the tire radial direction at which the mark is disposed, so that the visibility of the mark can be improved. In addition, in the mark, when light is applied to the curved surface portion, the reflected light smoothly moves in accordance with the angle of the applied light, so that the mark produces a soft impression and has excellent design properties. Therefore, the tire according to the present disclosure can achieve both desired visibility and design properties of the mark provided on the sidewall portion.

Although the particularly preferred embodiments of the present disclosure have been described in detail above, the present disclosure is not limited to the above-described embodiments, and various modifications can be made to implement the present disclosure.

What is claimed is:

1. A tire comprising a mark provided on a surface of a sidewall portion so as to be raised from the surface, wherein
   the mark includes a radially upper edge and a radially lower edge,
   a curved surface portion, which extends from the radially lower edge to the radially upper edge, is curved so as to project in a direction substantially perpendicular to the surface and has a first side in a first tire circumferential direction and a second side in a second tire circumferential direction opposite the first tire circumferential direction, and
a first flat surface portion connected to and extending laterally from the first side of the curved surface portion that gradually decreases in height from the connection to the first side, which is raised above the height of the sidewall, toward the sidewall surface with increasing distance in the first tire circumferential direction from the curved surface portion,
a second flat surface portion connected with and extending laterally from the second side of the curved surface portion that gradually decreases in height from the connection with the second side, which is raised above the height of the sidewall, toward the sidewall surface with increasing distance in the second tire circumferential direction from the curved surface portion, and
wherein, when viewed in a tire axial direction, a first boundary line between the first side of the curved surface portion and the first flat surface portion is a first curved line curved so as to project on the first side of the curved surface portion and a second boundary line between the second side of the curved surface portion and the second flat surface portion is a second curved line curved so as to project on the second side of the curved surface portion.

2. The tire according to claim 1, wherein a length in the first tire circumferential direction of the first flat surface portion is smaller than a length in the second tire circumferential direction of the second flat surface portion.

3. The tire according to claim 1, wherein a length in the first tire circumferential direction of the first flat surface portion is equal to a length in the second tire circumferential direction of the second flat surface portion.

4. The tire according to claim 1, wherein a contour of the curved surface portion in a tire meridian cross-section has a plurality of radii of curvature.

5. The tire according to claim 1, wherein a contour of the curved surface portion in a tire meridian cross-section has a constant radius of curvature.

6. The tire according to claim 1, wherein
a plurality of the marks are aligned adjacently in the tire circumferential direction on the sidewall portion,
each of the plurality of the marks includes the first flat surface portion and the second flat surface portion, and
a length in the second tire circumferential direction of the second flat surface portion of one of two of the plurality of marks adjacent to each other in the tire circumferential direction and a length in the first tire circumferential direction of the first flat surface portion of the other one of the two of the plurality of marks adjacent to each other in the tire circumferential direction are different from each other.

7. The tire according to claim 1, wherein, when viewed in the tire axial direction, at least one of the first curved line of the first boundary line between the first side of the first curved surface portion and the first flat surface portion or the second curved line of the second boundary line between the second side of the curved surface portion and the second flat surface portion is a parabolic curved line.

8. The tire according to claim 7, wherein a contour of the curved surface portion in a tire meridian cross-section has a plurality of radii of curvature.

9. The tire according to claim 7, wherein a contour of the curved surface portion in a tire meridian cross-section has a constant radius of curvature.

10. The tire according to claim 6, wherein, when viewed in the tire axial direction, the curved line first boundary line between the first side of the first curved surface portion and the first flat surface portion is a parabolic curved line.

11. The tire according to claim 6, wherein a contour of the curved surface portion in a tire meridian cross-section has a plurality of radii of curvature.

12. The tire according to claim 6, wherein a contour of the curved surface portion in a tire meridian cross-section has a constant radius of curvature.

13. The tire according to claim 1, wherein a sum of a length of the first flat surface portion in the first circumferential direction and a length of the second flat surface portion in the second circumferential direction is not greater than 90% of a width of the mark in a circumferential direction.

14. The tire according to claim 6, wherein a sum of the length of the second flat surface portion and the length of the first flat surface portion is not greater 90% of a width of the mark in the circumferential direction.

15. The tire according to claim 1, wherein a radius of curvature of the curved surface portion is between 65% and 105% of a width of the mark in a circumferential direction.

16. The tire according to claim 1, wherein the mark comprises at least one of a letter, character, symbol or figure.

17. A tire comprising a mark provided on a surface of a sidewall portion so as to be raised from the surface, wherein
the mark includes a radially upper edge and a radially lower edge,
a curved surface portion, which extends from the radially lower edge to the radially upper edge, is curved so as to project in a direction substantially perpendicular to the surface and has a first side in a first tire circumferential direction and a second side in a second tire circumferential direction opposite the first tire circumferential direction, and
a first flat surface portion connected to and extending laterally from the first side of the curved surface portion that gradually decreases in height from the connection to the first side, which is raised above the height of the sidewall, toward the sidewall surface with increasing distance in the first tire circumferential direction from the curved surface portion,
a second flat surface portion connected with and extending laterally from the second side of the curved surface portion that gradually decreases in height from the connection with the second side, which is raised above the height of the sidewall, toward the sidewall surface with increasing distance in the second tire circumferential direction from the curved surface portion,
wherein, when viewed in a tire axial direction, a first boundary line between the first side of the curved surface portion and the first flat surface portion is a first curved line curve so as to project on the first side of the curved surface portion surface and a second boundary line between the second side of the curved surface portion and the second flat surface portion is a second curved line curved so as to project on the second side of the curved surface portion,
wherein a length in the first tire circumferential direction of the first flat surface portion is smaller than a length in the second tire circumferential direction of the second flat surface portion, and
wherein the length of the length in the first tire circumferential direction of the first flat surface portion is larger than a height of the curved surface portion above the sidewall surface.

18. The tire according to claim 17, wherein the length of the first flat surface in the first circumferential direction is not less than 15% of a width of the mark in a circumferential direction,
   wherein the length of the second flat surface in the second circumferential direction is not less than 40% of the width of the mark in a circumferential direction,
   wherein a sum of the length in the first circumferential direction of the first flat surface portion and the length in the second circumferential direction of the second flat surface portion is not greater than 90% of a width of the mark in a circumferential direction.

19. The tire according to claim 18, wherein the mark comprises at least one of a letter, character, symbol or figure.

* * * * *